(12) United States Patent
Kolmanovsky et al.

(10) Patent No.: US 6,564,769 B2
(45) Date of Patent: May 20, 2003

(54) METHOD AND SYSTEM FOR OPERATING A DIRECT INJECTION SPARK INTERNAL COMBUSTION ENGINE HAVING VARIABLE COMPRESSION RATIO MODES

(75) Inventors: Ilya V Kolmanovsky, Ypsilanti, MI (US); Jeffrey Arthur Cook, Dearborn, MI (US); Jing Sun, Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 98 days.

(21) Appl. No.: 09/944,756

(22) Filed: Sep. 4, 2001

(65) Prior Publication Data

US 2003/0041837 A1 Mar. 6, 2003

(51) Int. Cl.$^7$ ............................................. F02B 17/00
(52) U.S. Cl. ..................... 123/295; 123/305; 123/429
(58) Field of Search ............................. 123/294, 295, 123/305, 429, 430

(56) References Cited

U.S. PATENT DOCUMENTS

| | | | | |
|---|---|---|---|---|
| 4,324,211 A | * | 4/1982 | Strong et al. | 123/143 |
| 4,520,765 A | * | 6/1985 | Gerace | 123/27 R |
| 4,635,590 A | * | 1/1987 | Gerace | 123/27 R |
| 5,947,079 A | | 9/1999 | Sivashankar et al. | |
| 6,041,757 A | | 3/2000 | Kadota | |
| 6,073,606 A | | 6/2000 | Shimizu et al. | |
| 6,089,206 A | | 7/2000 | Suzuki et al. | |
| 6,116,210 A | | 9/2000 | Oder et al. | |
| 6,173,570 B1 | * | 1/2001 | Mitsumoto et al. | 60/285 |
| 6,283,087 B1 | * | 9/2001 | Isaksen | 123/243 |
| 6,349,698 B2 | * | 2/2002 | Park | 123/295 |
| 6,386,177 B2 | * | 5/2002 | Urushihara et al. | 123/299 |

* cited by examiner

Primary Examiner—John Kwon
(74) Attorney, Agent, or Firm—Carlos L. Hanze

(57) ABSTRACT

A method of operating a variable compression, direct injection spark ignited internal combustion engine includes the steps of determining a demanded torque output of the engine, determining a current combustion mode and a current compression ratio mode of the engine; transitioning operation of the engine from the current combustion mode to a new combustion mode to produce the demanded torque output, and transitioning operation of the engine from the current compression ratio mode to a new compression ratio mode so as to minimize torque disturbances during the transitioning of engine operation from the current combustion mode to the new combustion mode.

28 Claims, 13 Drawing Sheets

METHOD AND SYSTEM FOR OPERATING A DIRECT INJECTION SPARK INTERNAL COMBUSTION ENGINE HAVING VARIABLE COMPRESSION RATIO MODES

BACKGROUND OF THE INVENTION

1. Field of the Invention

The present invention relates generally to direct injection spark ignition (DISI) internal combustion engines. More particularly, the invention relates to a method and system for operating a DISI internal combustion engine having a plurality of combustion and compression ratio operating modes.

2. Background Art

Direct injection spark ignition engines can be operated in a homogeneous combustion mode during high load operating conditions, and a stratified combustion mode for lean burn during low or part load operating conditions. In the homogeneous combustion mode, fuel is typically injected into the combustion chamber early in the intake stroke to allow sufficient mixing with an air charge prior to ignition. In the stratified mode, fuel is injected later in the compression stroke such that complete mixing is not achieved prior to ignition. Transitions between combustion modes often result in air/fuel (A/F) ratio discontinuities at the mode switches.

In the absence of adequate controls, such A/F discontinuities often result in objectionable transition torque disturbances that may be perceived by an operator. These torque disturbances can be mitigated as described for example in U.S. Pat. No. 5,947,079 by coordinating the engine electronic throttle, fuel flow and ignition timing. When transitioning from stratified to homogeneous, for example, manifold pressure may be decreased (throttle closed) and a constant torque maintained (fuel flow and spark retarded) until a manifold pressure is attained that corresponds to an achievable homogeneous operating point. At this point, the stratified-to-homogeneous transition is initiated by switching from late (compression stroke) to early (intake stroke) injection timing, and the fuel flow and spark advance are simultaneously adjusted to attain constant torque in the homogeneous mode. A similar approach is used to manage the homogeneous-to-stratified mode transitions.

During a stratified-to-homogeneous mode transition, however, it may be noted that an acceptable homogeneous mode torque may be achieved at an air/fuel (A/F) ratio greater (leaner) than the stratified operating point at which the mode transition is initiated. Consequently, the engine remains susceptible to misfire upon transition. Further, the combination of homogeneous lean-limit A/F and ignition timing constraints may not permit disturbance-free transitions at all operating points.

In view of the prior art, the inventors herein have recognized that the ability to control an engine's compression ratio provides an additional means by which to manage constant-torque mode transitions of a DISI internal combustion engine.

SUMMARY OF THE INVENTION

A method of operating a direct injection spark ignition (DISI) engine is disclosed having the steps of determining a demanded torque output of the engine, determining a current combustion mode and a current compression ratio mode of the engine, transitioning operation of the engine from the current combustion mode to a new combustion mode to produce the demanded torque output, and transitioning operation of the engine from the current compression ratio mode to a new compression ratio mode so as to minimize torque disturbances during the transitioning of engine operation from the current combustion mode to the new combustion mode. The DISI engine is provided with a variable compression ratio apparatus, or equivalent means, to vary the engine's compression ratio during combustion mode transitions.

An advantage of the above-described method, for example, is that torque disturbances resulting from transitions between homogeneous and stratified modes of operation can be minimized by transitioning from one compression ratio mode to another. As such, control of a variable compression ratio apparatus can be used to improve transition control from homogeneous to stratified modes of operation and visa-versa. Exemplary, non-limiting methods are disclosed herein for transitioning from stratified/high compression to homogeneous (high or low compression), homogeneous (low or high compression) to stratified/high compression, homogeneous/high compression to homogeneous/low compression, and homogeneous/low compression to homogeneous/high compression.

In a related aspect of the present invention, a corresponding system is also provided having a variable compression ratio apparatus. In accordance with a preferred embodiment, the system further includes a controller and corresponding computer and computer code for determining a demanded torque output of the engine, determining a desired combustion mode and desired compression ratio mode of the engine, transitioning engine operation to the desired combustion mode in order to produce the demanded torque, and transitioning engine operation as required from a first compression ratio mode to a second compression ratio mode so as to minimize torque disturbances during the transitioning of engine operation to the desired combustion mode.

Further advantages, objects and features of the invention will become apparent from the following detailed description of the invention taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numerals indicate like features and wherein.

DETAILED DESCRIPTION OF THE PREFERRED EMBODIMENTS

Figure 1:
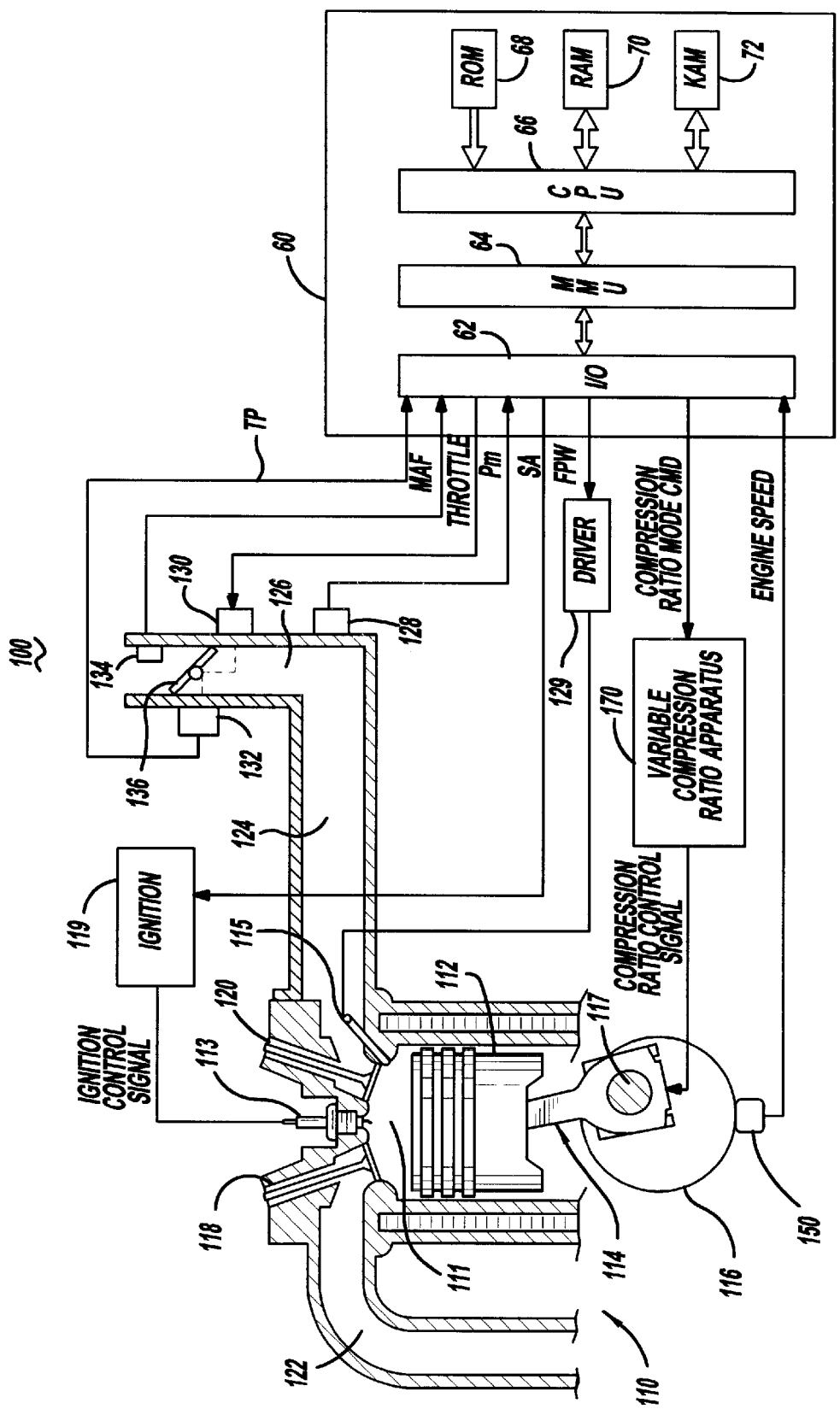
FIG. 1 is a diagram of a variable compression, direct injection spark ignition (DISI) internal combustion engine in accordance with the present invention.

FIG. 1 shows an exemplary variable compression ratio, direct injection spark ignited (DISI) internal combustion engine in accordance with a preferred embodiment of the present invention. As will be appreciated by those of ordinary skill in the art, the present invention is independent of the particular underlying engine configuration and component designs, and as such can be used with a variety of different DISI engines having more than one compression ratio operating modes. Similarly, the present invention is not limited to any particular type of apparatus required to vary the compression ratio of the engine.

Referring again to FIG. 1, the engine 110 includes a plurality of cylinders (only one shown), each of the cylinders having a combustion chamber 111, a reciprocating piston 112, and intake and exhaust valves 120 and 118 for communicating the combustion chamber 111 with intake and exhaust manifold 124 and 122. The piston 112 is coupled to a connecting rod 114, which itself is coupled to a crankpin 117 of a crankshaft 116, and includes a recess bowl or equivalent structure (not shown) required to form stratified charges of air and fuel within the combustion chamber 111. Fuel is provided to the combustion chamber 111 via a fuel injector 115, which is preferably disposed within the combustion chamber 111, and is delivered in proportion to a fuel pulse width (FPW) determined by an electronic engine controller 60 (or equivalent microprocessor-based controller) and provided via an electronic driver circuit 129. Air charge into the intake manifold 124 is nominally provided via an electronically controlled throttle plate 136 disposed within throttle body 126. Ignition spark is provided to the combustion chamber 111 via spark plug 113 and ignition system 119 in accordance with a spark advance (SA) signal from the electronic controller 60.

As shown in FIG. 1, the engine controller 60 nominally includes a microprocessor or central processing unit (CPU) 66 in communication with computer readable storage devices 68, 70 and 72 via memory management unit (MMU) 64. The MMU 64 communicates data (including executable code instructions) to and from the CPU 66 and among the computer readable storage devices, which for example may include read-only memory (ROM) 68, random-access memory (RAM) 70, keep-alive memory (KAM) 72 and other suitable memory devices for volatile or non-volatile data storage. The computer readable storage devices may be implemented using any known memory devices such as programmable read-only memory (PROM's), electrically programmable read-only memory (EPROM's), electrically erasable PROM (EEPROM's), flash memory, or any other electrical, magnetic, optical or combination memory devices capable of storing data, including executable code, used by the CPU 66 for controlling the engine and/or motor vehicle into which the engine is mounted. Input/output (I/O) interface 62 is provided for communicating with various sensors, actuators and control circuits, including but not limited to an engine speed sensor 150, electronic fuel control driver 129, ignition system 119, manifold pressure sensor (MAP) 128, mass air flow sensor (MAF) 134, throttle position sensor 132, and electronic throttle control motor 130.

Figure 2:
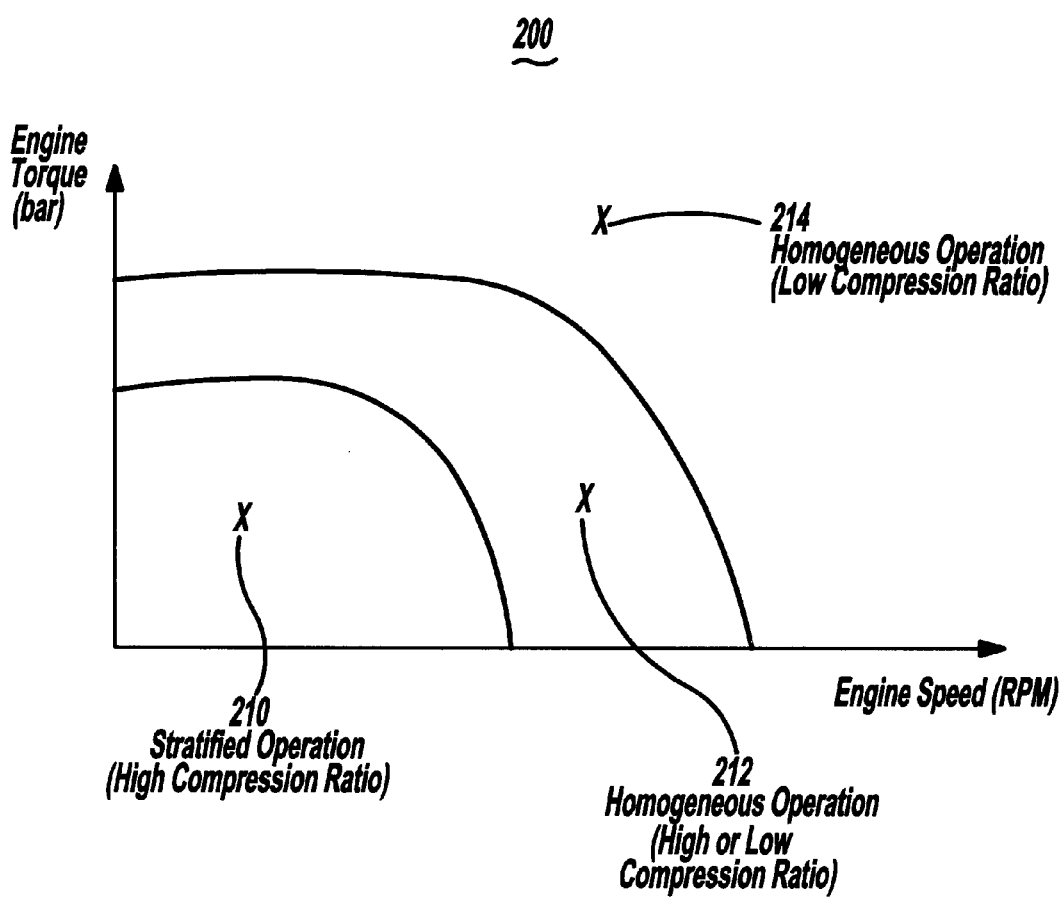
FIG. 2 is a diagram showing typical operational modes of a variable compression DISI internal combustion engine as a function of engine speed and engine torque.
Figure 3:
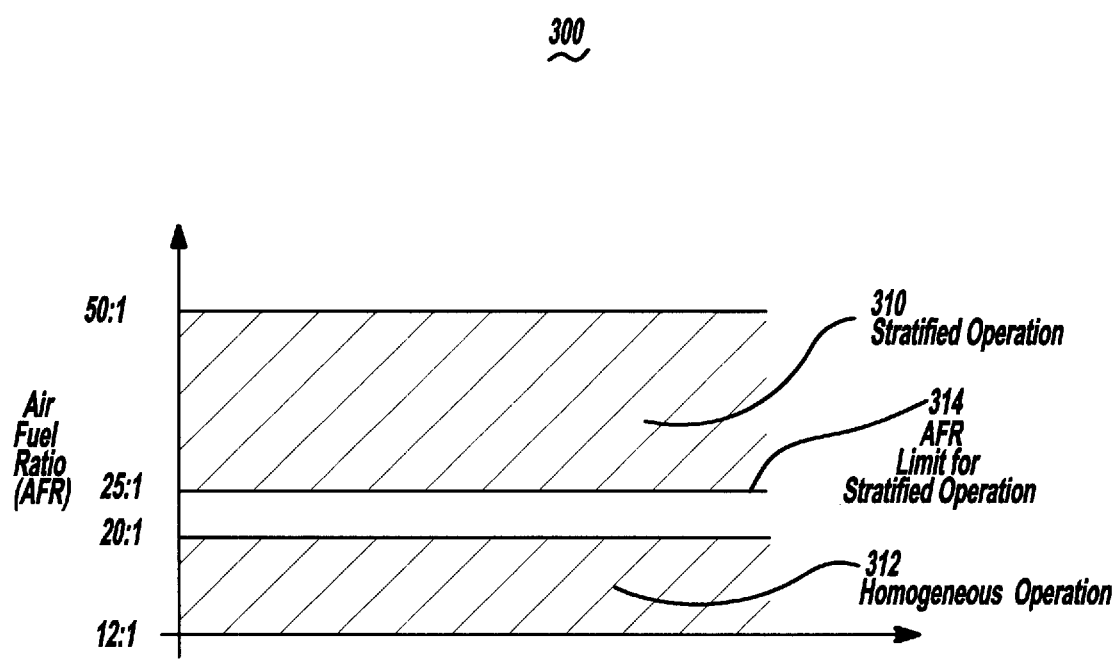
FIG. 3 is a plot showing exemplary air/fuel (A/F) ratios associated with stratified and homogeneous mode operation of a variable compression DISI internal combustion engine.

In response to a demanded torque output and signals received from one or more of the sensors identified above, the controller 60 in accordance with the present invention determines and provides the appropriate fuel, air flow and ignition controls required to operate the combustion chamber 111 in either a homogeneous air/fuel (A/F) mode or a stratified A/F mode in accordance with a predetermined operating strategy of the engine. See for example FIG. 2 showing typical operational modes of a variable compression DISI internal combustion engine as a function of engine speed and engine torque, and FIG. 3 showing nominal A/F ratio ranges for stratified and homogeneous mode operation.

In nominal stratified mode operation, the controller 60 activates the fuel injector 115 during the engine compression stroke such that stratified A/F layers are formed within the combustion chamber. The stratified A/F layers are formed such that strata closest to the spark plug are nominally stoichiometric or slightly rich of stoichiometric, and outer strata are progressively leaner with increasing distance from the spark plug.

In the homogeneous operating mode, the controller 60 nominally causes the fuel injector 115 to deliver fuel to the combustion chamber during the intake stroke of the engine cycle. In this mode, a substantially homogeneous air/fuel mixture is formed in the combustion chamber when the spark plug 113 is activated by the ignition system 119. Controller 60 via the driver 129 controls the amount of fuel delivered by fuel injector 66 so that the homogeneous air/fuel mixture in chamber 30 can be selected to be at stoichiometry, a value rich of stoichiometry or a value lean of stoichiometry.

Referring again to FIG. 1, the engine 110 also includes and a variable compression ratio apparatus 170. "Compression ratio," as known and understood in the art, is defined as the ratio of the volume in the cylinder above the piston 112 when the piston is at bottom-dead-center (BDC) to the volume ("clearance volume") in the cylinder above the piston 112 when the piston 112 is at top-dead-center (TDC). In a non-limiting embodiment, the variable compression ratio apparatus 170 is operated so as to vary the effective length of the connecting rod 114, and thus the clearance volume and compression ratio of the engine. Such an apparatus is described, for example, in U.S. application Ser. No. _____, entitled "Connecting Rod for a Variable Compression Engine," which is owned by the assignee of the present invention and is hereby incorporated by reference in its entirety.

Advantageously, the variable compression ratio apparatus 170 of FIG. 1 is used when transitioning operation of the DISI engine from one combustion mode to another, e.g., from homogeneous to stratified mode or stratified to homogeneous. The apparatus 170 can be used for example in accordance with the method of FIG. 4, which includes the steps of determining a demanded torque output ($Tq^d$) of the engine, step 401, determining desired combustion and compression ratio operating modes of the engine based on the demanded torque, step 402, determining the current combustion and compression ratio operating modes of the engine, step 403, determining whether a combustion mode transition is required to provide the demanded torque, step 404, determining whether a compression ratio transition is required as part of the combustion mode transition, step 405, and if required, transitioning operation of the engine from the current compression ratio operating mode to a new compression ratio operating mode during the transition from the current combustion mode to a new combustion mode, step 406. The demanded torque output $T_q^d$ can be calculated as known in the art based on the driver's pedal input and accessory loads. The desired combustion modes, e.g., homogenous versus stratified, for example can be determined based on a measured engine speed and after-treatment requirements. The compression ratio operating mode can be determined for example by monitoring the pressure inside one or more of the engine's cylinders or by monitoring or inferring the configuration of the variable compression ratio apparatus. If a transition from one combustion mode to another is required, then in accordance with step 406 the variable compression ratio apparatus can be operated to minimize torque disturbances during the combustion mode transitions.

Figure 4:
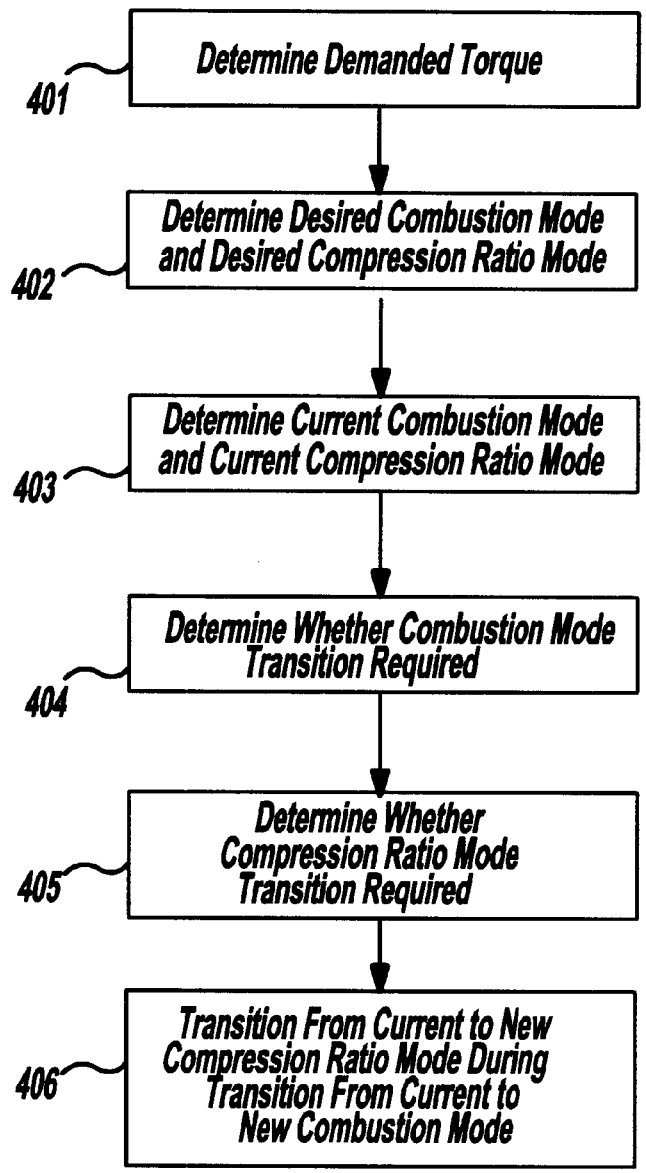
FIG. 4 is a flow diagram of a preferred method for operating a variable compression DISI internal combustion engine in accordance with the present invention.
Figure 5:
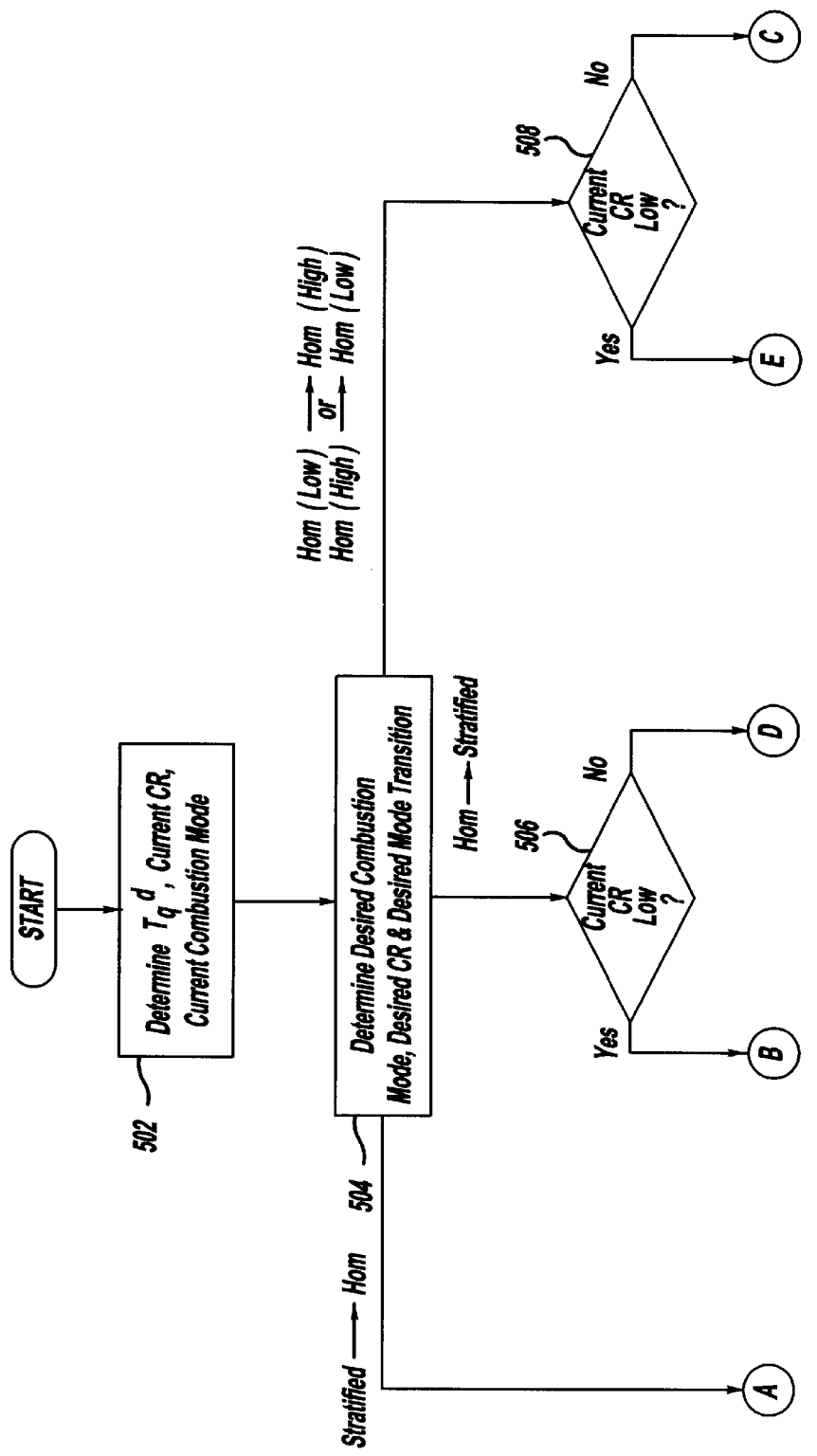
FIG. 5 is a detailed flow diagram of an exemplary method in accordance with the method of FIG. 4.
Figure 6A:
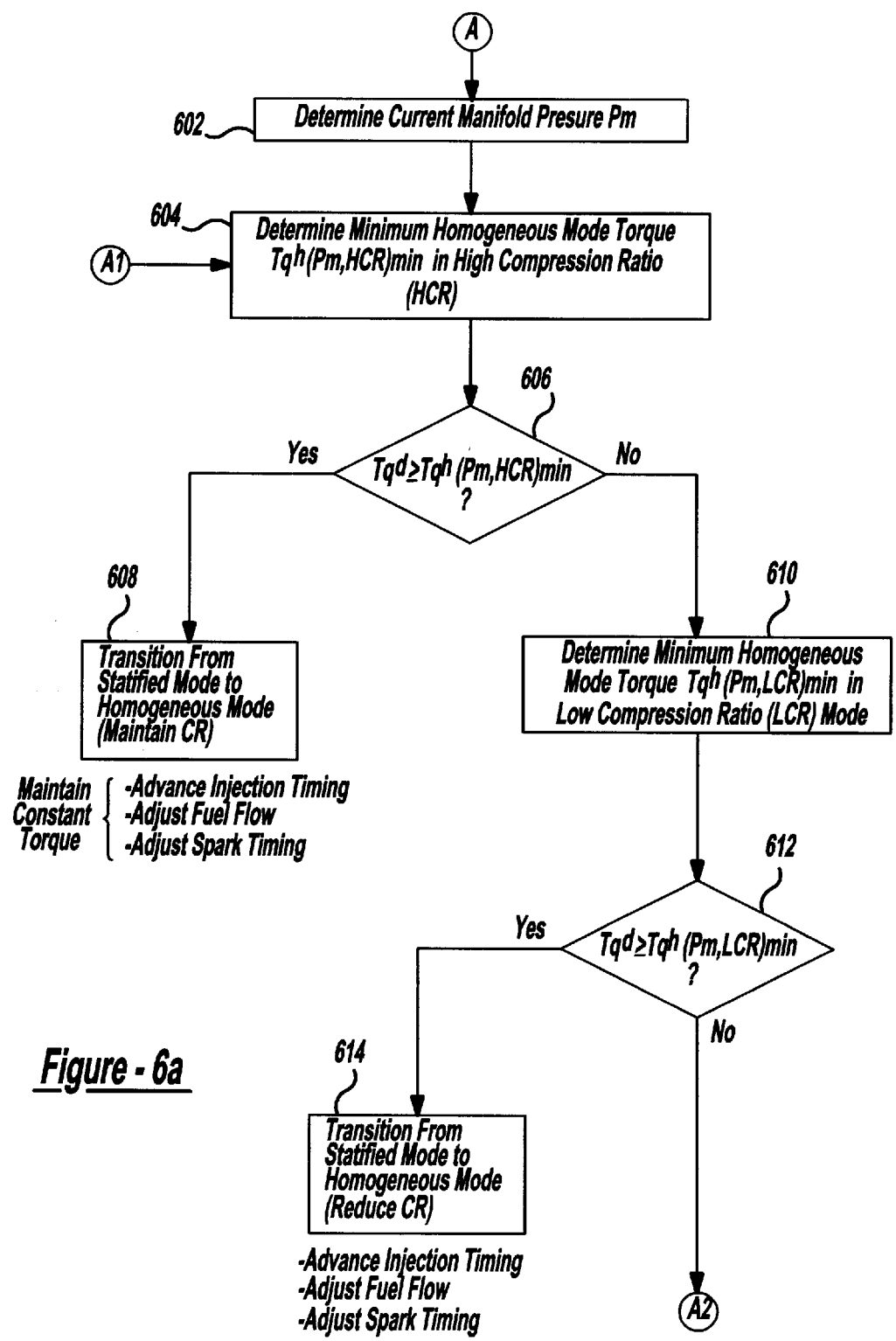
FIGS. 6a and 6b are detailed flow diagrams of a preferred method for transitioning operation of a variable compression DISI internal combustion engine from a stratified/high compression mode of operation to a homogeneous mode of operation in accordance with the present invention.
Figure 6B:
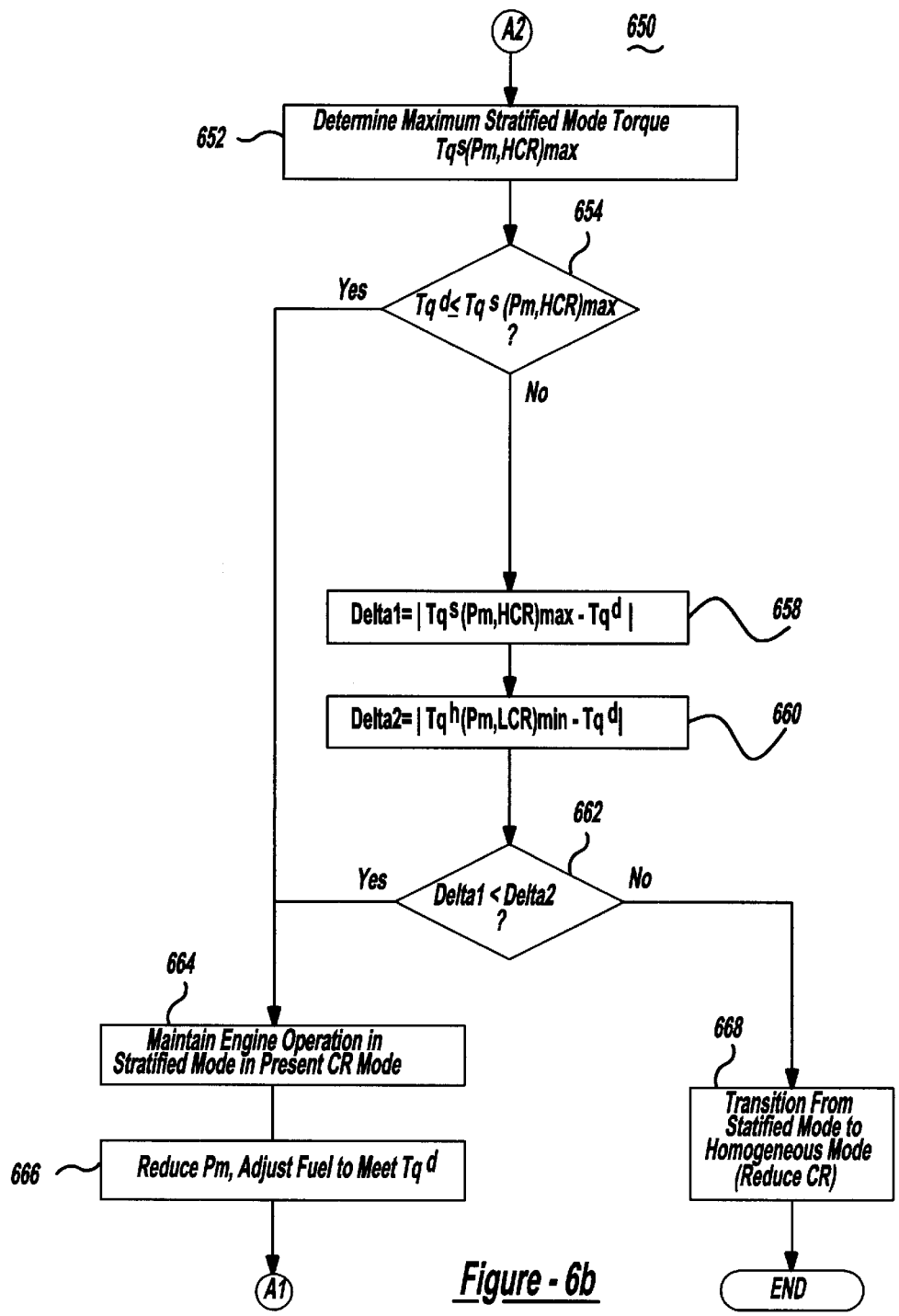

FIG. 5 shows a detailed flow diagram of an exemplary method in accordance with the method of FIG. 4. The method again includes the steps of determining the demanded torque $Tq^d$, the current combustion mode and the current compression operating mode, step 502, and determining the desired combustion mode, desired compression ratio operating mode and the corresponding combustion mode transition required for delivering $Tq^d$, step 504. If the current combustion mode is "Stratified" and the desired combustion mode is "Homogeneous," then the method described below with reference to FIGS. 6a and 6b is performed in order to transition the combustion mode from stratified to homogeneous mode. If however the current combustion mode is "Homogeneous" and the desired combustion mode is "Stratified," then step 506 is performed to check the current compression ratio mode.

During stratified mode operation, high compression operation is desired due to increased thermal efficiency and increased engine knock tolerance. If the desired combustion mode is stratified, and if the current compression ratio mode is low and the current combustion mode is homogeneous, then a transition from a homogeneous/low compression mode to a stratified/high compression mode is required. If the current compression ratio is high, then a transition from homogeneous/high compression to stratified/high compression is required. Exemplary methods for transitioning from homogeneous/low compression to stratified and from homogeneous/high to stratified are described below with reference to FIGS. 7a/7b and FIGS. 9a/9b, respectively.

FIGS. 6a and 6b show a method in accordance with the present invention for transitioning operation of a variable compression DISI engine from stratified (high compression) mode to homogeneous mode. If a transition is required in accordance with FIG. 5, step 510, then the current intake manifold pressure (Pm) is determined for example by using MAP sensor 128, step 602 in FIG. 6a. Alternatively, the value of Pm can be inferred as known and understood in the art. Step 604 is then performed to estimate a minimum homogeneous mode torque ($[Tq^h(Pm, HCR)]_{min}$) available at high compression for the given manifold pressure $P_m$. $[Tq^h(Pm, HCR)]_{min}$ is nominally expressed by the torque regression function $f_h$(RPM, A/F, SA, Pm, HCR) for homogeneous operation at high compression as shown below with reference to Equation (1):

$$[Tq^h(Pm, HCR)]_{min} = \min[f_h(RPM, A/F, SA, Pm, HCR)] \quad \text{Eq. (1)}$$

(A/F, SA)

wherein RPM is the measured engine speed, A/F corresponds to a homogeneous air-fuel mixture, SA is the spark advance angle for homogeneous operation, Pm is the measured manifold pressure, and HCR is the value of the compression ratio corresponding to the high compression ratio mode. In accordance with Equation (1), A/F and SA are allowed to vary within predetermined combustion limits required to ensure combustion stability in a homogeneous/high compression mode. See for example 512 in FIG. 3 for a range of A/F ratios corresponding to homogeneous combustion. Typically, subject to the combustion limits, the minimum value of the function $f_h$(RPM, A/F, SA, Pm, HCR) is achieved when A/F corresponds to a lean limit and SA corresponds to the most retarded spark allowable for stable combustion. $[Tq^h(Pm, HCR)]_{min}$ can be calculated on-line by the engine controller in accordance with Equation (1), or pre-calculated and stored in the controller's computer memory and used as required.

Referring again to FIG. 6a, if the demanded torque $Tq^d$ is greater than or equal to $[Tq^h(Pm, HCR)]_{min}$, step 606, then the compression ratio HCR is maintained and a transition made from stratified/high compression to homogeneous/high compression. The transition from stratified to homogeneous mode in this case can be made as known in the art by advancing injection timing while adjusting fuel flow and spark timing so as to maintain constant torque during the transition.

If however $Tq^d$ in less than $[Tq^h(Pm, HCR)]_{min}$, then the controller 60 computes a minimum homogeneous mode torque at low compression ($[Tq^h(Pm, LCR)]_{min}$) in accordance with step 610 and Equation (2):

$$[Tq^h(Pm, LCR)]_{min} = \min[f^h(RPM, A/F, SA, Pm, LCR)] \quad \text{Eq. (2)}$$

(A/F, SA)

wherein A/F and SA are air-fuel mixture and spark advance values, respectively, constrained within predetermined limits corresponding to stable homogeneous combustion at low compression. As indicated above with respect to Equation (1), A/F and SA are allowed to vary within the corresponding predetermined combustion limits so as to minimize the value of $f_h$(RPM, A/F, SA, Pm, LCR). If the demanded torque $Tq^d$ is greater than or equal to $[Tq^h(Pm, LCR)]_{min}$, step 612, then the compression ratio is reduced from high to low during the transition from stratified to homogeneous combustion. Fuel flow, spark timing and injection timing are adjusted as known in the art to provide the demanded torque $Tq^d$, step 614. $[Tq^h(Pm, LCR)]_{min}$ can be calculated on-line by the engine controller in accordance with Equation (2), or pre-calculated and stored in the controller's computer memory and used as required.

Referring now to FIG. 6b, if $Tq^d$ in less than $[Tq^h(Pm, LCR)]_{min}$, then the controller 60 computes a maximum stratified mode torque at high compression ($[Tq^s(Pm, HCR)]_{max}$) in accordance with step 652 and Equation (3):

$$[Tq^s(Pm, HCR)]_{max} = \max[f_s(RPM, A/F, SA, EIO, Pm, HCR)] \quad \text{Eq. (3)}$$

(A/F, SA, EIO)

wherein $f_s(RPM, A/F, SA, EIO, Pm, HCR)$ represents a torque regression function for stratified operation, EIO is the injection timing, and A/F and SA are air-fuel mixture and spark advance values, respectively, and wherein A/F, SA and EIO each are allowed to vary within ranges corresponding to stable stratified combustion at high compression. Typically, the maximum of the function $f_s(RPM, A/F, SA, EIO, Pm, HCR)$ is achieved at the rich limit of A/F and MBT spark. $[Tq^s(Pm, HCR)]_{max}$ can be calculated on-line by the engine controller in accordance with Equation (3), or pre-calculated and stored in the controller's computer memory and used as required.

If the demanded torque $Tq^d$ is less than or equal to $[Tq^s(Pm, HCR)]_{max}$, step 654, then the torque demand can be met with the stratified mode and thus the engine continues to operate in stratified mode at the present compression ratio mode, nominally high compression in accordance with step 664. If however $Tq^d$ is greater than $[Tq^s(Pm, HCR)]_{max}$, then the torque demand cannot be met by either the stratified or homogeneous mode for the current Pm. Steps 658, 660 and 662 are then performed to determine which mode of operation, stratified/high compression or homogenous/low compression, will result in less error in torque control. This check is done by computing the absolute difference values (DELTA1 and DELTA2) between $Tq^d$ and the estimated minimum homogeneous and maximum stratified mode torques in accordance with Equations (4) and (5) provided below:

$$\text{DELTA1} = |[Tq^s(Pm, HCR)]_{max} - Tq^d| \quad \text{Eq. (4)}$$

$$\text{DELTA2} = |[Tq^h(Pm, LCR)]_{min} - Tq^d| \quad \text{Eq. (5)}$$

If DELTA1 is less than DELTA2, step 662, then operation in stratified mode at high compression will minimize the error in torque control. In such case the engine operation is maintained in the stratified/high compression mode, step 664. Otherwise, engine operation is transitioned from stratified/high compression to homogeneous/low compression by simultaneously advancing the injection timing and reducing the compression ratio, step 668. Also, as described above with respect to FIG. 6a, step 614, fuel flow and spark timing are adjusted as known in the art to provide the demanded torque $Tq^d$.

Figure 7A:
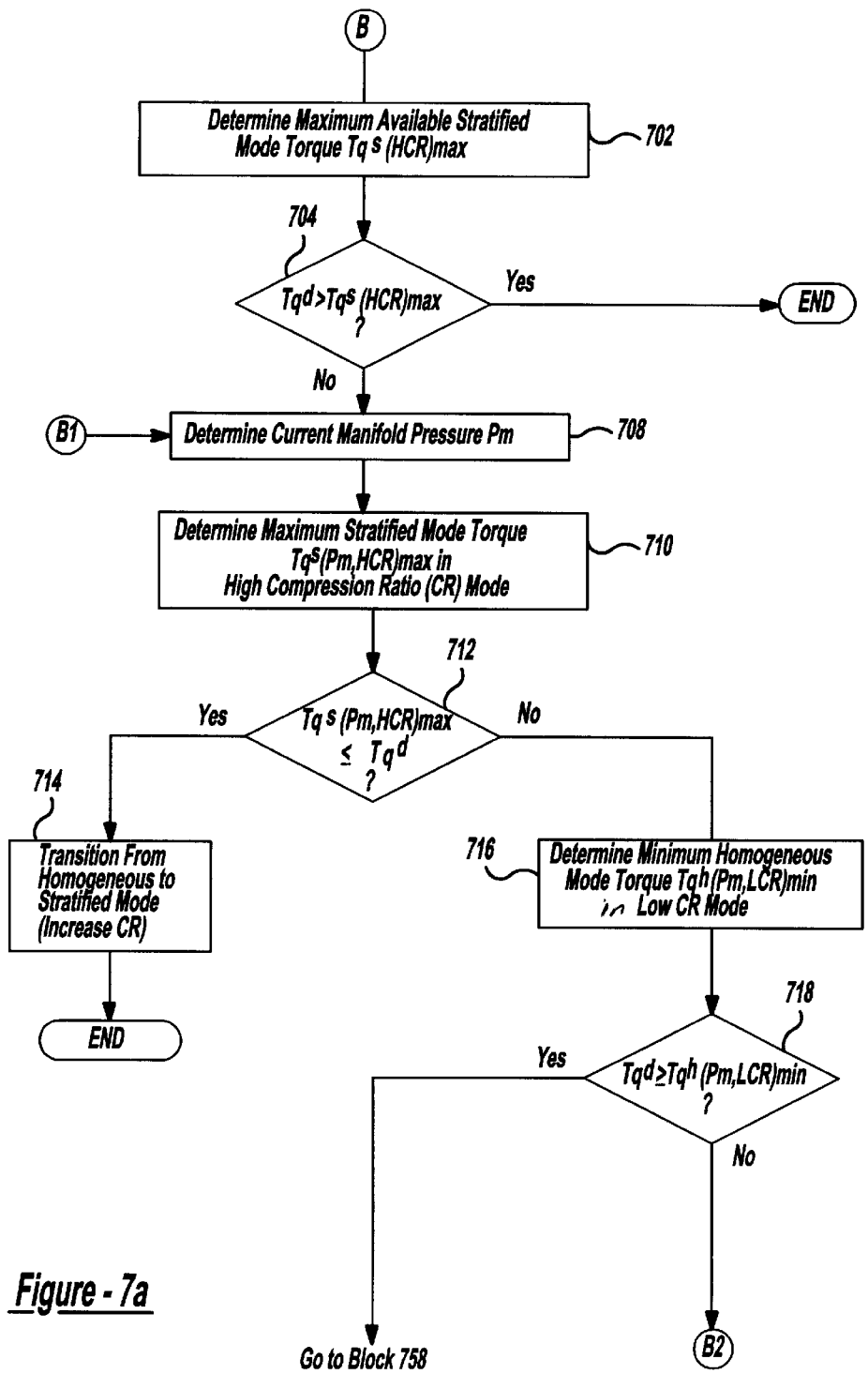
FIGS. 7a and 7b are detailed flow diagrams of a preferred method for transitioning operation of a variable compression DISI internal combustion engine from a homogeneous/low compression mode of operation to a stratified/high compression mode of operation in accordance with the present invention.
Figure 7B:
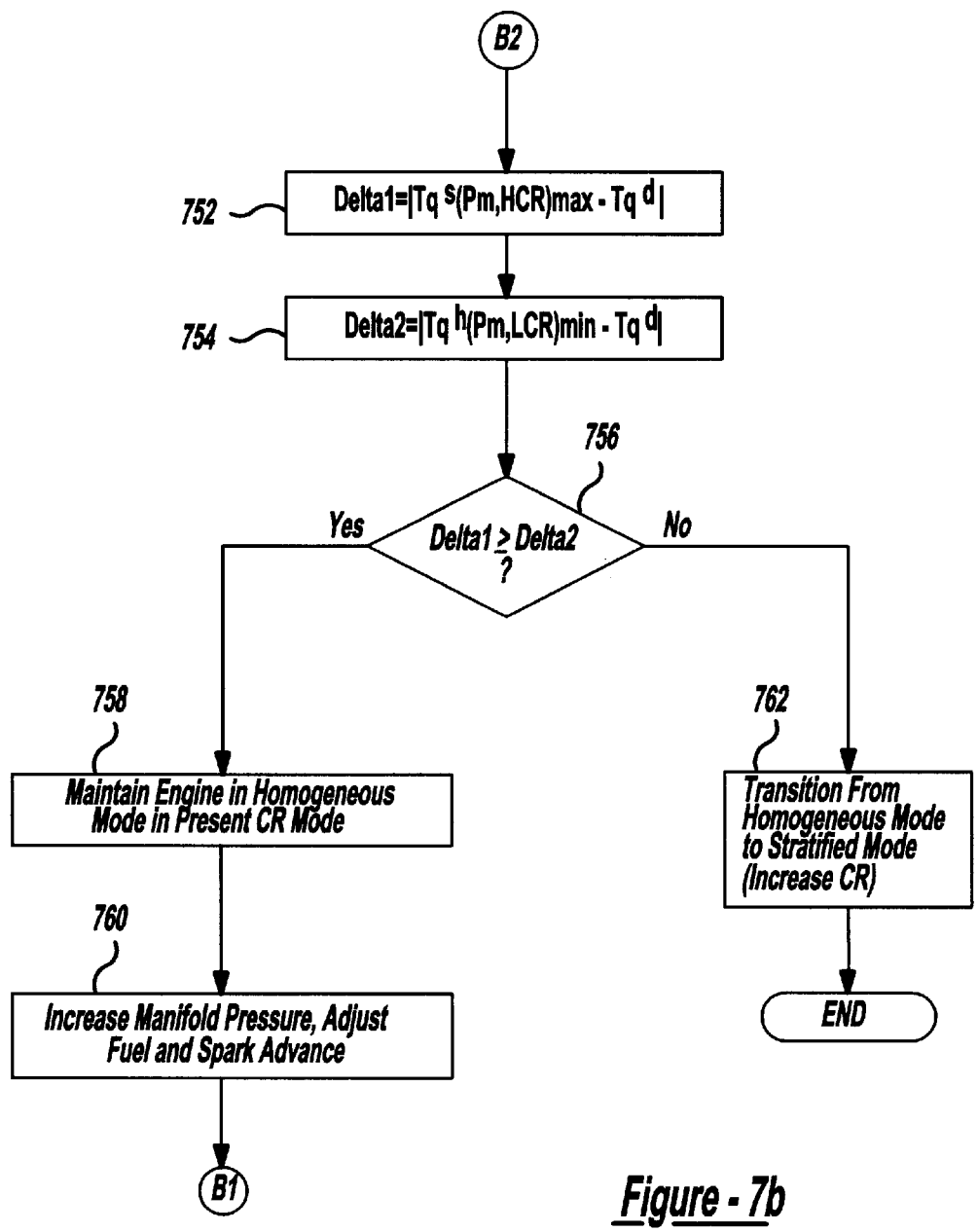

FIGS. 7a and 7b show detailed flow diagrams of a preferred method for transitioning from a homogeneous/low compression mode of engine operation to a stratified/high compression mode of engine operation in accordance with the present invention. As shown in FIG. 7a, a maximum available stratified mode torque ($[Tq^s(HCR)]_{max}$) at high compression ratio is computed in accordance with step 702 and Equation (6) below:

$$[Tq^s(HCR)]_{max} = \max[f_s(RPM, A/F, SA, EIO, Pm, HCR)] \quad \text{Eq. (6)}$$

(A/F, SA, EIO, Pm)

wherein the variables RPM, A/F, SA, EIO, Pm, HCR are the same as those described with reference to Equation (3) above. In accordance with Equation 6, A/F, SA, EIO and Pm are allowed to vary within ranges corresponding to stable stratified combustion at high compression ratio. $[Tq^s(HCR)]_{max}$ can be calculated on-line by the engine controller in accordance with Equation (6), or pre-calculated and stored in the controller's computer memory and used as required.

$[Tq^s(HCR)]_{max}$ is compared to the demanded torque $Tq^d$, step 704, and if $Tq^d$ exceeds $[Tq^s(HCR)]_{max}$, then no transition is possible, i.e., the engine cannot produce the demanded torque by running in stratified mode. If however $Tq^d$ is less than or equal to $[Tq^s(HCR)]_{max}$, then the current manifold pressure Pm is measured or inferred, step 708, and a maximum stratified mode torque at high compression ($[Tq^s(Pm, HCR)]_{max}$) computed for the current manifold pressure in accordance with Equation (7) and step 710:

$$[Tq^s(Pm, HCR)]_{max} = \max[f_s(RPM, A/F, SA, EIO, Pm, HCR)] \quad \text{Eq. (7)}$$

(A/F, SA, EIO)

wherein A/F, SA and EIO each are allowed to vary within ranges corresponding to stable stratified combustion at high compression ratio. As with Equation (3) above, the maximum of the function $f_s(RPM, A/F, SA, EIO, Pm, HCR)$ is typically achieved at the rich limit of A/F and MBT spark. $[Tq^s(Pm, HCR)]_{max}$ can be calculated on-line by the engine controller in accordance with Equation (7), or pre-calculated and stored in the controller's computer memory and used as required.

Referring to step 712 of FIG. 7a, if $Tq^d$ is less than $[Tq^s(Pm, HCR)]_{max}$ as computed in step 710, then a transition is made from homogeneous/low compression mode to a stratified/high compression mode by simultaneously retarding injection timing and increasing the compression ratio from low compression to high compression, step 714. Again, fuel flow and spark timing are adjusted as known in the art to provide the demanded torque $Tq^d$. If however $Tq^d$ is less than $[Tq^s(Pm, HCR)]_{max}$, then a minimum homogeneous mode torque $[Tq^h(Pm, LCR)]_{min}$ is computed at low compression for the given Pm in accordance with Equation (1), step 716. If the demanded torque $Tq^d$ is greater than or equal to $[Tq^h(Pm, LCR)]_{min}$, step 718, then the torque demand can be met with the homogeneous mode in the present compression ratio mode and thus engine operation is maintained in the homogeneous, low compression ratio mode.

If however $Tq^d$ is less than $[Tq^h(Pm, LCR)]_{min}$, then the torque demand cannot be met by either the homogeneous or stratified mode for the current Pm. Steps 752, 754 and 756 are then performed to determine which mode of operation, stratified/high compression or homogenous/low compression, will result in less error in torque control. This check is done by computing the absolute difference values (DELTA1 and DELTA2) between $Tq^d$ and the estimated maximum stratified and minimum homogeneous mode torques in accordance with Equations (4) and (5) provided above. If DELTA1 is less than DELTA2, step 756, then stratified/high compression mode operation will minimize torque control error. In such case the engine operation is transitioned from the homogeneous/low compression mode to the stratified/high compression mode by simultaneously retarding injection timing and increasing the compression ratio, step 762. Fuel flow and spark timing is then adjusted as known in the art to provide the demanded torque $Tq^d$.

Referring again to FIG. 7b, if DELTA1 is greater than or equal to DELTA2 in accordance with step 756, then engine operation is maintained in the homogeneous/low compression mode and the torque error minimized by increasing the manifold pressure and adjusting fuel flow, step 760. Control is then returned to step 708 (B1) and subsequent steps repeated until a transition from homogeneous/low compression to stratified/high compression is effected.

Figure 8:
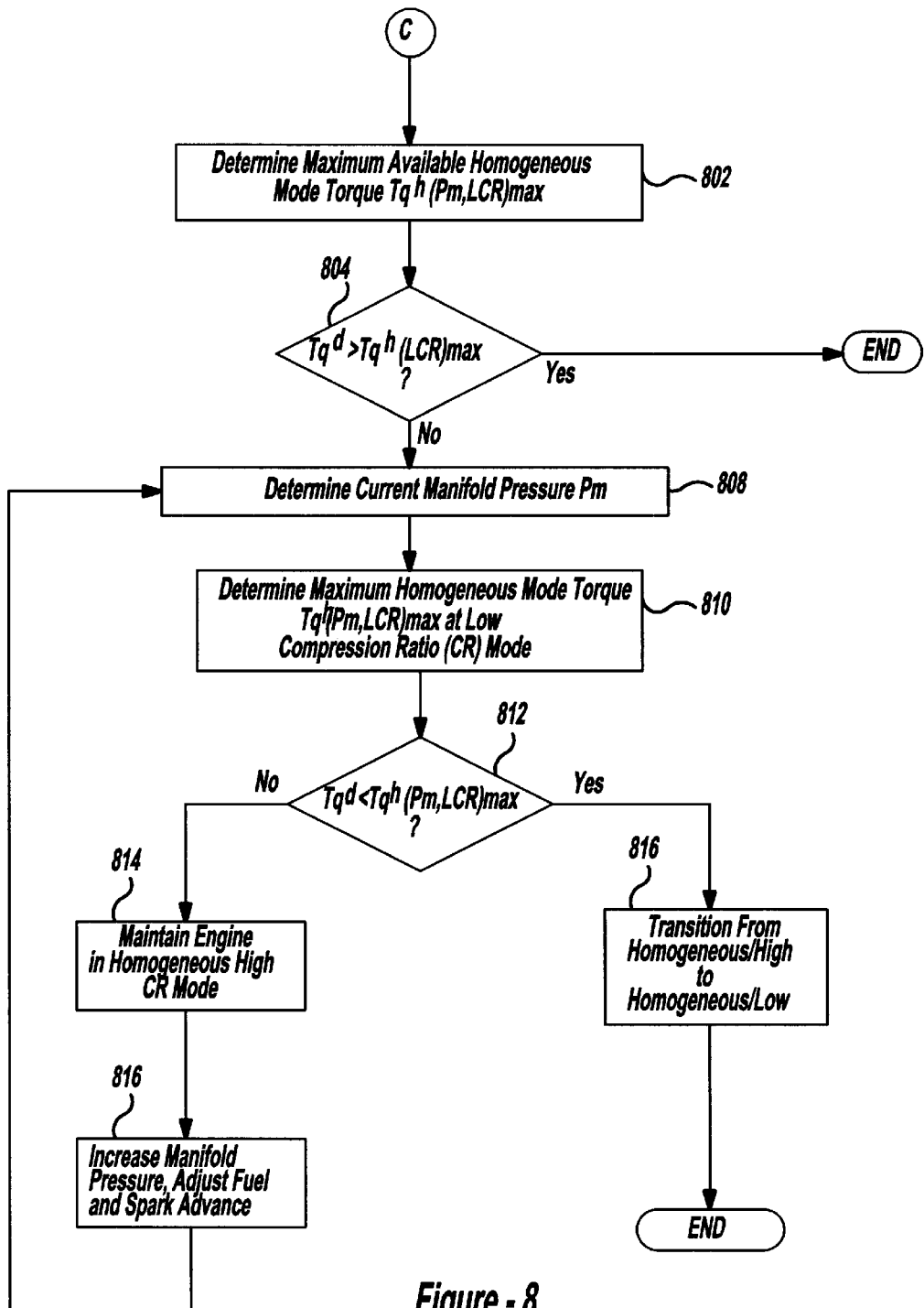
FIG. 8 is a detailed flow diagram of a preferred method for transitioning operation of a variable compression DISI internal combustion engine from a homogeneous/high compression ratio mode of operation to a homogeneous/low compression ratio mode of operation in accordance with the present invention.

FIG. 8 is a detailed flow diagram of a preferred method for transitioning from a homogeneous/high compression ratio mode of engine operation to a homogeneous/low compression ratio mode of engine operation in accordance with the present invention. A maximum available homogeneous mode torque ($[Tq^h(LCR)]_{max}$) at low compression ratio is computed in accordance with step 802 and Equation (8) below:

$$[Tq^h(LCR)]_{max} = \max[f_h(RPM, A/F, SA, Pm, LCR)] \qquad \text{Eq. (8)}$$

(A/F, SA, Pm)

wherein $f_h$(RPM, A/F, SA, Pm, LCR) represents a torque regression function for homogeneous operation at low compression ratio, and wherein RPM is the measured engine speed, A/F is a homogeneous air-fuel mixture, SA is the spark advance angle for homogeneous operation, Pm is the measured manifold pressure, and LCR is the value of the compression ratio corresponding to the low compression ratio mode. In accordance with Equation 8, A/F, SA and Pm are allowed to vary within ranges corresponding to stable homogeneous combustion at low compression ratio. Typically, the maximum of the function $f_h$(RPM, A/F, SA, Pm, LCR) is achieved at an A/F ratio slightly rich of stoichiometric and an SA value corresponding to MBT. $[Tq^h(LCR)]_{max}$ can be calculated on-line by the engine controller in accordance with Equation (8), or pre-calculated and stored in the controller's computer memory and used as required.

Next, $[Tq^h(LCR)]_{max}$ is compared to the demanded torque $Tq^d$, step 804, and if $Tq^d$ exceeds $[Tq^h(LCR)]_{max}$, then no transition is possible. If however $Tq^d$ is less than or equal to $[Tq^h(LCR)]_{max}$, then the current manifold pressure is measured or inferred, step 808, and a maximum homogeneous mode torque at low compression ($[Tq^h(Pm, LCR)]_{max}$) computed for the current manifold pressure in accordance with Equation (9) and step 810:

$$[Tq^h(Pm, LCR)]_{max} = \max[f_h(RPM, A/F, SA, EIO, Pm, LCR)] \qquad \text{Eq. (9)}$$

(A/F, SA)

wherein the variables are same as described with respect to Equation (3). $[Tq^h(Pm, LCR)]_{max}$ can be calculated online by the engine controller in accordance with Equation (9), or pre-calculated and stored in the controller's computer memory and used as required.

Next, if the demanded torque $Tq^d$ is less than $[Tq^h(Pm, LCR)]_{max}$, step 812, then engine operation is transitioned from high compression to low compression while simultaneously increasing fuel flow and adjusting spark timing to meet the demanded torque, step 816. Otherwise, constant torque is maintained at high compression by opening the throttle to increase intake manifold pressure while adjusting fuel flow and spark advance. Steps 808, 810 and 812 are repeated until a transition from homogeneous/high compression to homogeneous/low compression is effected.

Figure 9A:
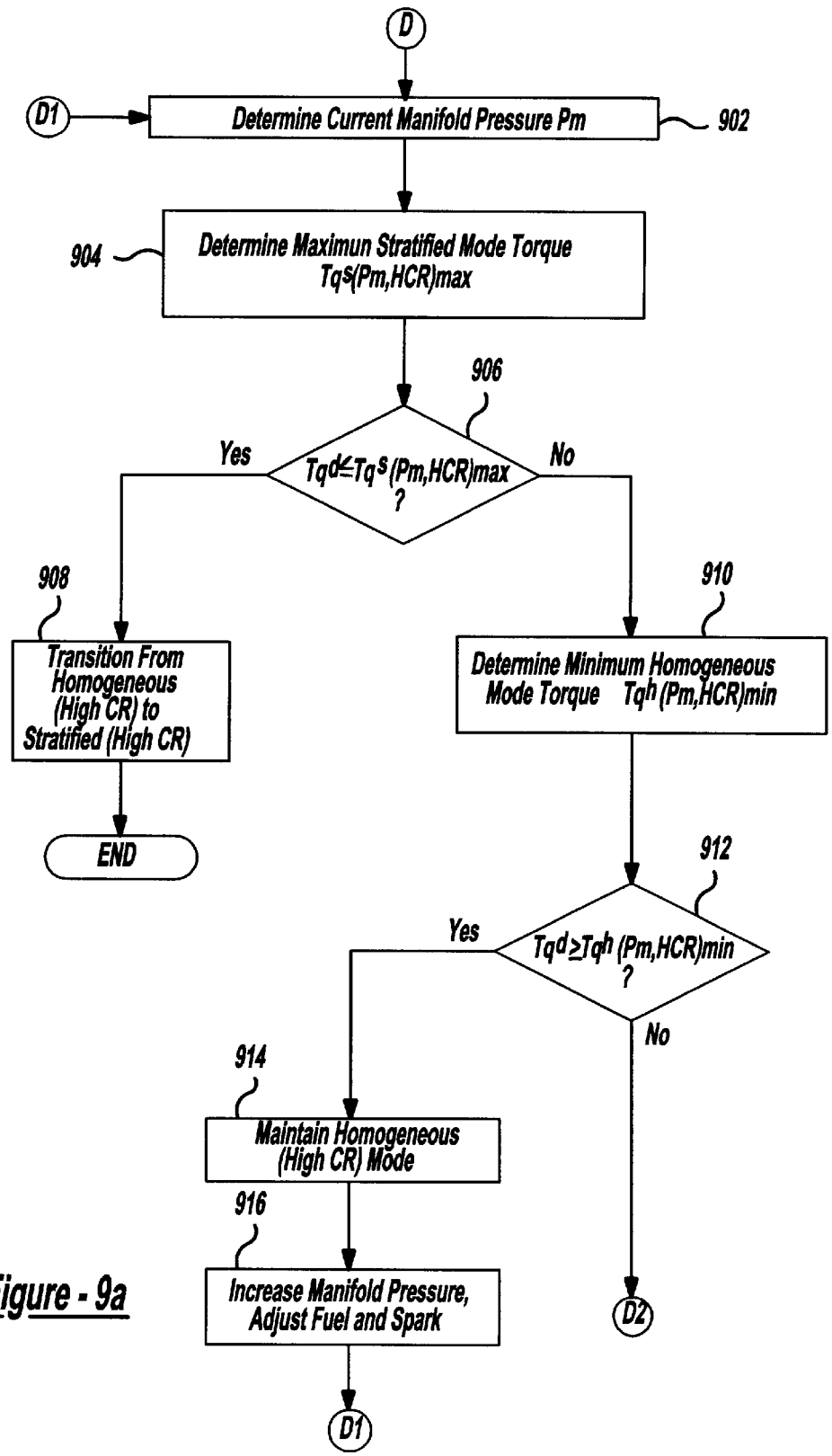
FIGS. 9a and 9b are detailed flow diagrams of a preferred method for transitioning operation of a variable compression DISI internal combustion engine from a homogeneous/high compression ratio mode of operation to a stratified/high compression ratio mode of operation in accordance with the present invention.
Figure 9B:
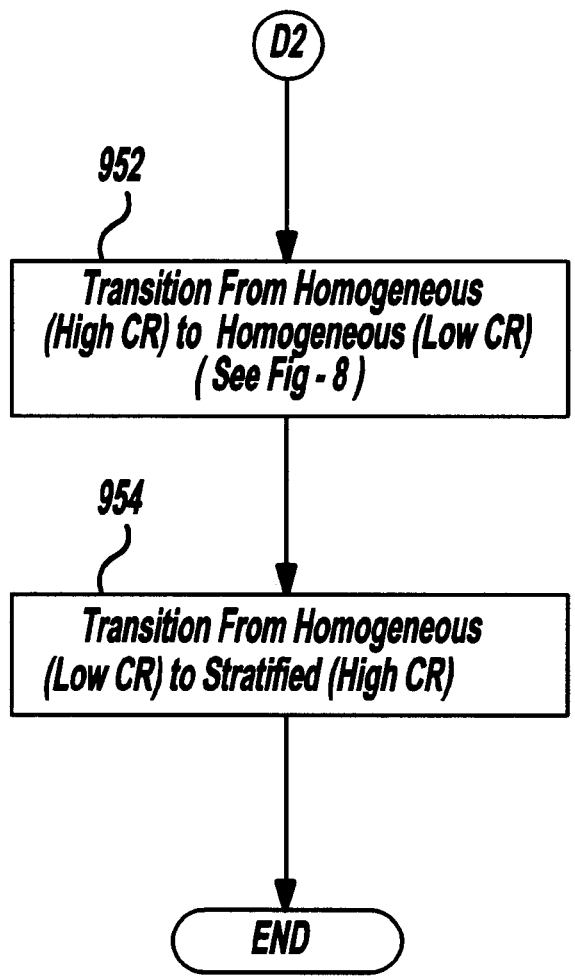

FIGS. 9a and 9b are detailed flow diagrams of a preferred method for transitioning from a homogeneous/high compression ratio mode of engine operation to a stratified/high compression ratio mode of operation in accordance with the present invention. In accordance with step 902 and 904, the current manifold pressure Pm is measured or estimated and $[Tq^s(Pm, HCR)]_{max}$ computed in accordance with Equation (3). If the demanded torque $Tq^d$ is less than or equal to $[Tq^s(Pm, HCR)]_{max}$, then engine operation is transitioned from homogeneous/high compression to stratified/high compression by retarding injection timing and adjusting fuel and spark to match the demanded torque, step 908.

Otherwise, if the demanded torque $Tq^d$ exceeds $[Tq^s(Pm, HCR)]_{max}$, then a check is performed to determined whether the $Tq^d$ can be satisfied in the homogeneous mode at high compression for the current manifold pressure, steps 910 and 912. $[Tq^h(Pm, HCR)]_{min}$ is computed as shown in Equation (1). If $Tq^d$ equals or exceeds $[Tq^d(Pm, HCR)]_{min}$, then engine operation continues in the homogeneous/high mode, step 914, the throttle opened to increase the intake manifold pressure, and fuel and spark adjusted to meet the demanded torque, step 916. Control is then returned to step 902 and subsequent steps repeated until a transition from homogeneous/high compression to homogeneous/low compression is effected.

Referring again to FIG. 9a and also FIG. 9b, if $Tq^d$ is less than $[Tq^h(Pm, HCR)]_{min}$, then engine operation is transitioned from homogeneous/high compression to homogeneous/low compression as described above with reference to FIG. 8, step 952, followed by a transition from homogeneous/low compression to stratified/high compression as described above with reference to FIGS. 7a and 7b.

Figure 10:
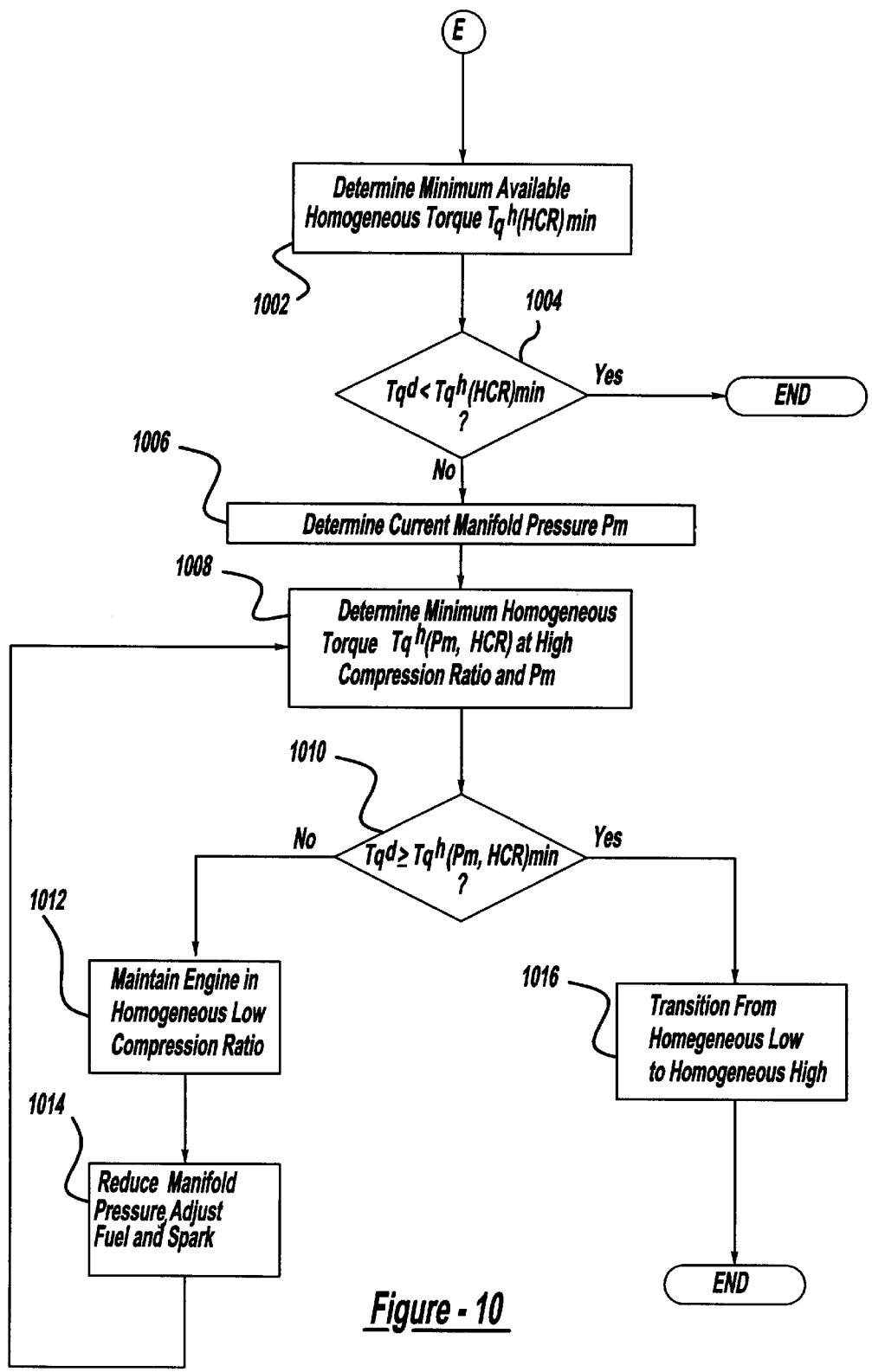
FIG. 10 is a detailed flow diagram of a preferred method for transitioning operation of a variable compression DISI internal combustion engine from a homogeneous/low compression ratio mode of operation to a homogeneous/high compression ratio mode of operation in accordance with the present invention.

FIG. 10 shows a detailed flow diagram of a preferred method for transitioning operation of a variable compression DISI internal combustion engine from homogeneous/low compression to homogeneous/high compression ratio in accordance with the present invention. A minimum available homogeneous mode torque ($[Tq^h(HCR)]_{min}$) at high compression ratio is computed in accordance with step 1002 and Equation (10) below:

$$[Tq^h(HCR)]_{min} = \min[f_h(RPM, A/F, SA, Pm, HCR)] \qquad \text{Eq. (10)}$$

(A/F, SA, Pm)

wherein $f_h$(RPM, A/F, SA, Pm, HCR) represents a torque regression function for homogeneous operation at high compression ratio, and wherein RPM is the measured engine speed, A/F is a homogeneous air-fuel mixture, SA is the spark advance angle for homogeneous operation, Pm is the measured manifold pressure, and HCR is the value of the compression ratio at the high compression ratio mode. In accordance with Equation 10, A/F, SA and Pm are allowed to vary within ranges corresponding to stable homogeneous combustion at high compression ratio. Typically, the minimum value of the function $f_h$(RPM, A/F, SA, Pm, HCR) is achieved at the A/F lean limit and an SA value corresponding to most retarded spark allowable for stable combustion. $[Tq^h(HCR)]_{min}$ can be calculated on-line by the engine controller in accordance with Equation (10), or pre-calculated and stored in the controller's computer memory and used as required.

Next, $[Tq^h(HCR)]_{min}$ is compared to the demanded torque $Tq^d$, step 1004, and if $Tq^d$ is less than $[Tq^h(HCR)]_{min}$, then no transition is possible. If however $Tq^d$ is greater than or equal to $[Tq^h(HCR)]_{min}$, then the current manifold pressure is measured or inferred, step 1006, and a minimum homogeneous mode torque at high compression ($[Tq^h(Pm, HCR)]_{min}$) computed for the current manifold pressure in accordance with Equation (11) and step 1008:

$$[Tq^h(Pm, HCR)]_{min} = \min[f_h(RPM, A/F, SA, Pm, HCR)] \qquad \text{Eq. (11)}$$

(A/F, SA)

wherein the variables are same as described with respect to Equations (10). $[Tq^h(Pm, HCR)]_{min}$ can be calculated on-line by the engine controller in accordance with Equation (11), or pre-calculated and stored in the controller's computer memory and used as required.

If the demanded torque $Tq^d$ is greater than or equal to $[Tq^h(Pm, HCR)]_{min}$, step 1010, then engine operation is transitioned from low compression ratio to high compression ratio, step 1016. Otherwise, constant torque is maintained at low compression by closing the throttle to reduce intake manifold pressure while adjusting fuel flow and spark advance. Steps 1008, 1010 and 1012 and 1014 are repeated until a transition from homogeneous/low compression to homogeneous/high compression is effected.

Although the present invention has been described in connection with particular embodiments thereof, it is to be understood that various modifications, alterations and adaptations may be made by those skilled in the art without departing from the spirit and scope of the invention. It is intended that the invention be limited only by the appended claims.

What is claimed:

1. A method of operating a variable compression, direct injection spark ignited internal combustion engine, comprising:
    determining a demanded torque output of the engine;
    determining a current combustion mode and a current compression ratio mode of the engine;
    transitioning operation of the engine from the current combustion mode to a new combustion mode to produce the demanded torque output; and
    transitioning operation of the engine from the current compression ratio mode to a new compression ratio mode to minimize torque disturbances during said transitioning from the current combustion mode to the new combustion mode.

2. A method of operating a direct injection spark ignited internal combustion engine having homogeneous and stratified modes of operation and a variable compression ratio apparatus for varying the compression ratio of the engine, comprising:
    determining a demanded torque output of the engine;
    transitioning operation of the engine to and from the homogeneous mode and the stratified mode as required to produce the demanded torque; and
    operating the variable compression ratio apparatus to minimize torque disturbances produced as a result of said transitioning step.

3. The method according to claim 2, further comprising the step of maintaining the compression ratio of the engine in a high compression ratio mode during stratified operation of the engine.

4. The method according to claim 2, further comprising the step of maintaining the compression ratio of the engine in a low compression ratio mode during homogeneous operation of the engine.

5. The method according to claim 2, further comprising the step of maintaining the compression ratio of the engine in a high compression ratio mode during homogeneous operation of the engine.

6. A method of operating a variable compression, direct injection spark ignited internal combustion engine having a plurality of cylinders and corresponding combustion chambers operating in a stratified combustion mode wherein a stratified mixture of air and fuel is provided within the combustion chambers, and a homogenous combustion mode wherein a homogeneous mixture of air and fuel is provided within the combustion chambers, the engine also being operable in a high compression ratio mode and a low compression ratio mode, the method comprising:
    determining a demanded torque output of the engine;
    determining a desired combustion mode and desired compression ratio mode of the engine based on the demanded torque; and
    operating the engine in the high compression ratio mode if the desired combustion mode is the stratified mode.

7. A method of operating a variable compression, direct injection spark ignited internal combustion engine having a plurality of cylinders and corresponding combustion chambers operating in a stratified/high compression ratio mode wherein a stratified mixture of air and fuel is provided within the combustion chambers at high compression, and a homogenous mode wherein a homogeneous mixture of air and fuel is provided within the combustion chambers, the method comprising:
    determining a demanded torque output of the engine;
    determining a current manifold pressure of the engine;
    estimating a minimum homogenous mode torque at high compression based at least in part on the current manifold pressure and a high compression ratio of the engine;
    comparing the demanded torque to the estimated minimum homogenous mode torque at high compression; and
    transitioning engine operation from the stratified/high compression mode to a homogeneous/high compression mode if the demanded torque is greater than or equal to the minimum homogenous mode torque at high compression.

8. The method according to claim 7, further comprising the step of adjusting one or more of injection timing, fuel flow and spark timing to maintain a constant torque output of the engine during said transitioning of engine operation from the stratified/high compression mode to a homogeneous/high compression mode.

9. The method according to claim 7, wherein the method further comprises:
    if the demanded torque is less than the minimum homogenous mode torque at high compression, estimating a minimum homogenous mode torque at low compression based at least in part on the current manifold pressure and a low compression ratio of the engine; and
    transitioning engine operation from the stratified/high compression mode to a homogeneous/low compression mode if the demanded torque is greater than or equal to the minimum homogenous mode torque at low compression.

10. The method according to claim 9, further comprising the step of adjusting one or more of injection timing, fuel flow and spark timing to maintain a constant torque output of the engine during said transitioning of engine operation from the stratified/high compression mode to the homogeneous/low compression mode.

11. The method according to claim 9, further comprising:
    if the demanded torque is less than the minimum homogenous mode torque at low compression, estimating a maximum stratified mode torque at high compression based at least in part on the current manifold pressure and a high compression ratio of the engine;
    estimating a first value equal to the magnitude of the difference between the maximum stratified mode torque at high compression and the demanded torque;
    estimating a second value equal to the magnitude of the difference between the minimum homogenous mode torque at low compression and the demanded torque; and
    transitioning engine operation from the stratified/high compression mode to a homogeneous/low compression mode if the second value does not exceed the first value.

12. The method according to claim 11, further comprising the step of adjusting one or more of injection timing, fuel flow and spark timing to maintain a constant torque output of the engine during said transitioning of engine operation from the stratified/high compression mode to the homogeneous/low compression mode.

13. A method of operating a variable compression, direct injection spark ignited internal combustion engine having a plurality of cylinders and corresponding combustion chambers operating in a homogeneous/low compression ratio mode wherein a homogeneous mixture of air and fuel is provided within the combustion chambers at low compression, and a stratified/high compression ratio mode wherein a stratified mixture of air and fuel is provided within the combustion chambers at high compression, comprising:

determining a demanded torque output of the engine;
estimating a maximum available stratified mode torque at high compression based at least in part on a high compression ratio of the engine; and
determining whether to transition from the homogeneous/low compression mode to the stratified/high compression mode if the demanded torque does not exceed the maximum available stratified mode torque at high compression.

14. A method of operating a variable compression, direct injection spark ignited internal combustion engine having a plurality of cylinders and corresponding combustion chambers operating in a homogeneous/low compression ratio mode wherein a homogeneous mixture of air and fuel is provided within the combustion chambers at low compression, and a stratified/high compression ratio mode wherein a stratified mixture of air and fuel is provided within the combustion chambers at high compression, comprising:

determining a demanded torque output of the engine;
determining a current manifold pressure of the engine;
estimating a maximum stratified mode torque at high compression based at least in part on the current manifold pressure and a high compression ratio of the engine;
comparing the demanded torque to the estimated maximum stratified mode torque at high compression; and
transitioning engine operation from the homogeneous/low compression mode to the stratified/high compression mode if the demanded torque is less than or equal to the maximum stratified mode torque at high compression.

15. The method according to claim 14, further comprising the step of adjusting one or more of injection timing, fuel flow and spark timing to maintain a constant torque output of the engine during said transitioning of engine operation from the homogeneous/low compression mode to the stratified/high compression mode.

16. The method according to claim 14, wherein the method further comprises:

if the demanded torque is greater than the maximum stratified mode torque at high compression, estimating a minimum homogenous mode torque at low compression based at least in part on the current manifold pressure and a low compression ratio of the engine;
estimating a first value equal to the magnitude of the difference between the maximum stratified mode torque at high compression and the demanded torque;
estimating a second value equal to the magnitude of the difference between the minimum homogenous mode torque at low compression and the demanded torque; and
transitioning engine operation from the homogeneous/low compression mode to the stratified/high compression mode if the second value exceeds the first value.

17. The method according to claim 16, further comprising the step of adjusting one or more of injection timing, fuel flow and spark timing to maintain a constant torque output of the engine during said transitioning of engine operation from the homogeneous/low compression mode to the stratified/high compression mode.

18. A method of operating a variable compression, direct injection spark ignited internal combustion engine having a plurality of cylinders and corresponding combustion chambers operating in a homogeneous/high compression ratio mode wherein a homogeneous mixture of air and fuel is provided within the combustion chambers at low compression, and a homogeneous/low compression ratio mode wherein a homogeneous mixture of air and fuel is provided within the combustion chambers at low compression, comprising:

determining a demanded torque output of the engine;
estimating a maximum available homogeneous mode torque at low compression based at least in part on the current manifold pressure and a low compression ratio of the engine;
determining whether to transition from the homogeneous/high compression mode to the homogeneous/low compression mode if the demanded torque does not exceed the maximum available homogeneous mode torque at low compression.

19. A method of operating a variable compression, direct injection spark ignited internal combustion engine having a plurality of cylinders and corresponding combustion chambers operating in a homogeneous/high compression ratio mode wherein a homogeneous mixture of air and fuel is provided within the combustion chambers at low compression, and a homogeneous/low compression ratio mode wherein a homogeneous mixture of air and fuel is provided within the combustion chambers at low compression, comprising:

determining a demanded torque output of the engine;
determining a current manifold pressure of the engine;
estimating a maximum homogeneous mode torque at low compression based at least in part on the current manifold pressure and a low compression ratio of the engine;
comparing the demanded torque to the estimated maximum homogeneous mode torque at low compression; and
transitioning engine operation from the homogeneous/high compression mode to the homogeneous/low compression mode if the maximum homogeneous mode torque at low compression exceeds the demanded torque.

20. The method according to claim 19, further comprising the step of adjusting one or more of injection timing, fuel flow and spark timing to maintain a constant torque output of the engine during said transitioning of engine operation from the homogeneous/low compression mode to the stratified/high compression mode.

21. A method of operating a variable compression, direct injection spark ignited internal combustion engine having a plurality of cylinders and corresponding combustion chambers operating in a homogeneous/high compression ratio mode wherein a homogeneous mixture of air and fuel is provided within the combustion chambers at low compression, and a stratified/high compression ratio mode wherein a stratified mixture of air and fuel is provided within the combustion chambers at high compression, comprising:

determining a demanded torque output of the engine;

determining a current manifold pressure of the engine;

estimating a maximum stratified mode torque at high compression based at least in part on the current manifold pressure and a high compression ratio of the engine;

comparing the demanded torque to the estimated maximum homogeneous mode torque at high compression; and transitioning engine operation from the homogeneous/high compression mode to the stratified/high compression mode if the demanded torque exceeds the maximum stratified mode torque at high compression.

22. The method according to claim 21, further comprising the step of adjusting one or more of injection timing, fuel flow and spark timing to maintain a constant torque output of the engine during said transitioning of engine operation from the homogeneous/low compression mode to the stratified/high compression mode.

23. The method according to claim 21, further comprising:

if the demanded torque is not greater than the maximum stratified mode torque at high compression, estimating a minimum homogeneous mode torque at high compression based at least in part on the current manifold pressure and a high compression ratio of the engine; and if the demanded torque is greater than the minimum homogeneous mode torque at high compression, transitioning from a homogeneous/high compression mode to a homogeneous/low compression mode, said step of transitioning from a homogeneous/high compression mode to a homogeneous/low compression mode comprising the steps of determining a demanded torque output of the engine, determining a current manifold pressure of the engine, estimating a maximum homogeneous mode torque at low compression based at least in part on the current manifold pressure and a low compression ratio of the engine, comparing the demanded torque to the estimated maximum homogeneous mode torque at low compression; and transitioning engine operation from the homogeneous/high compression mode to the homogeneous/low compression mode if the maximum homogeneous mode torque at low compression exceeds the demanded torque; and transitioning from the homogeneous/low compression mode to the stratified/high compression mode, said step of transitioning from the homogeneous/low compression mode to the stratified/high compression mode comprising the steps of determining the demanded torque output of the engine, determining the current manifold pressure of the engine, estimating a maximum stratified mode torque at high compression based at least in part on the current manifold pressure and a high compression ratio of the engine, comparing the demanded torque to the estimated maximum stratified mode torque at high compression, and transitioning engine operation from the homogeneous/low compression mode to the stratified/high compression mode if the demanded torque is less than or equal to the maximum stratified mode torque at high compression.

24. A method of operating a variable compression, direct injection spark ignited internal combustion engine having a plurality of cylinders and corresponding combustion chambers operating in a homogeneous/high compression ratio mode wherein a homogeneous mixture of air and fuel is provided within the combustion chambers at high compression, and a homogeneous/low compression ratio mode wherein a homogeneous mixture of air and fuel is provided within the combustion chambers at low compression, comprising:

determining a demanded torque output of the engine;

estimating a minimum available homogeneous mode torque at high compression based at least in part on a high compression ratio of the engine; and determining whether to transition from the homogeneous/high compression mode to the homogeneous/low compression mode if the demanded torque is not less than the minimum available homogeneous mode torque at high compression.

25. A method of operating a variable compression, direct injection spark ignited internal combustion engine having a plurality of cylinders and corresponding combustion chambers operating in a homogeneous/high compression ratio mode wherein a homogeneous mixture of air and fuel is provided within the combustion chambers at high compression, and a homogeneous/low compression ratio mode wherein a homogeneous mixture of air and fuel is provided within the combustion chambers at low compression, comprising:

determining a demanded torque output of the engine;

determining a current manifold pressure of the engine;

estimating a minimum homogeneous mode torque at high compression based at least in part on the current manifold pressure and a high compression ratio of the engine;

comparing the demanded torque to the estimated minimum homogeneous mode torque at high compression; and transitioning engine operation from the homogeneous/low compression mode to the homogeneous/high compression mode if the demanded torque is greater than or equal to the minimum homogeneous mode torque at high compression.

26. The method according to claim 25, further comprising the step of adjusting one or more of injection timing, fuel flow and spark timing to maintain a constant torque output of the engine during said transitioning of engine operation from the homogeneous/low compression mode to the homogeneous/high compression mode.

27. A system for operating a variable compression, direct injection spark ignited internal combustion engine, comprising:

a variable compression apparatus for varying the compression ratio of the internal combustion engine;

a controller in communication with the variable compression apparatus for determining a demanded torque output of the engine, determining a desired combustion mode and desired compression ratio mode of the engine, transitioning engine operation to the desired combustion mode in order to produce the demanded torque, and transitioning engine operation as required from a first compression ratio mode to a second compression ratio mode to minimize torque disturbances during transitioning of engine operation to the desired combustion mode.

28. An article of manufacture for operating a variable compression, direct injection spark ignited internal combustion engine, comprising:

a computer usable medium; and a computer readable program code embodied in the computer usable medium for directing a computer to control the steps of determining a desired combustion mode and desired compression ratio mode of the engine, transitioning engine operation to the desired combustion mode in order to produce the demanded torque, and transitioning engine operation as required from a first compression ratio mode to a second compression ratio mode to minimize torque disturbances during transitioning of engine operation to the desired combustion mode.

* * * * *